(12) United States Patent
Olsen

(10) Patent No.: US 8,540,954 B2
(45) Date of Patent: Sep. 24, 2013

(54) $CO_2$—CAPTURE IN MOLTEN SALTS

(75) Inventor: Espen Olsen, Ås (NO)

(73) Assignee: Universitetet for Miljo-og Biovitenskap Institutt for Matematiske Realfag og Teknologi, Aas (NO)

( * ) Notice: Subject to any disclaimer, the term of this patent is extended or adjusted under 35 U.S.C. 154(b) by 109 days.

(21) Appl. No.: 13/322,259

(22) PCT Filed: May 28, 2010

(86) PCT No.: PCT/NO2010/000195
§ 371 (c)(1),
(2), (4) Date: Feb. 8, 2012

(87) PCT Pub. No.: WO2010/137995
PCT Pub. Date: Dec. 2, 2010

(65) Prior Publication Data
US 2012/0128559 A1    May 24, 2012

(30) Foreign Application Priority Data
May 28, 2009   (NO) .................................. 20092083

(51) Int. Cl.
| | | |
|---|---|---|
| *C01F 5/26* | (2006.01) | |
| *C01F 5/02* | (2006.01) | |
| *C01F 5/06* | (2006.01) | |
| *C01F 11/20* | (2006.01) | |
| *C01F 11/02* | (2006.01) | |
| *C01F 11/06* | (2006.01) | |
| *C01D 3/00* | (2006.01) | |
| *C01D 1/02* | (2006.01) | |
| *C01D 15/02* | (2006.01) | |
| *C01D 15/04* | (2006.01) | |
| *C01D 17/00* | (2006.01) | |
| *B01D 53/62* | (2006.01) | |

(52) U.S. Cl.
USPC .......................................... 423/220; 423/230

(58) Field of Classification Search
USPC ........... 423/220, 490, 497, 498, 499.1, 499.3, 423/499.4, 635, 641
See application file for complete search history.

(56) References Cited

U.S. PATENT DOCUMENTS

| | | | |
|---|---|---|---|
| 3,661,753 A * | 5/1972 | Aylward et al. ................ | 204/212 |
| 2005/0036932 A1 | 2/2005 | Takahashi | |
| 2008/0286643 A1 | 11/2008 | Iwasaki | |
| 2009/0016948 A1 * | 1/2009 | Young ........................... | 423/414 |

OTHER PUBLICATIONS

International Search Report issued Aug. 23, 2010 in International (PCT) Application No. PCT/NO2010/000195 of which the present application is the national stage.
International Preliminary Report on Patentability issued Aug. 25, 2011 in International (PCT) Application No. PCT/N02010/000195 of which the present application is the national stage.
Norwegian Search Report issued Nov. 25, 2009 in corresponding Norwegian Patent Application No. 20092083.

* cited by examiner

*Primary Examiner* — Stuart Hendrickson
*Assistant Examiner* — Daniel Berns
(74) *Attorney, Agent, or Firm* — Wenderoth, Lind & Ponack, L.L.P.

(57) ABSTRACT

The present invention concerns carbon dioxide capture from waste gas, where metal oxides dissolved in salt melts are used as absorbents.

8 Claims, 5 Drawing Sheets

$CO_2$—CAPTURE IN MOLTEN SALTS

The present invention relates to the capture of carbon dioxide, $CO_2$, from exhaust gases using an absorption medium.

In a conventional heat power plant, coal is oxidized with air in a ratio >>1. The exhaust gas from a conventional fired boiler contains 10-15% $CO_2$ and the temperature is 800° C. at the boiler exit. The hot exhaust gas is heat exchanged with water and generates superheated steam under high pressure that is used to drive a turbine which again drives a generator for electrical power. The electrical efficiency is relatively low, about 40-60%. The heated steam is condensed before it once again is heat exchanged with the hot exhaust gases from the combustion process. The condensation process releases considerable heat that can be used for the purpose of remote heating in so called combined heat and power plants (CHP). This increases the total efficiency of a plant to about 70%.

The most current technology for the cleaning of $CO_2$ from a heat power plant is based on the absorption of $CO_2$ in amines. After decompression and cooling in the turbine, the exhaust gases are passed through a large reactor where $CO_2$ is absorbed in an amine based liquid at 30-40° C. The remaining exhaust gases are released to the atmosphere, but the $CO_2$ rich amine liquid is fed into another chamber where the temperature is increased to 120-130° C. and $CO_2$ is selectively released. The released gas can then be compressed to a liquid and disposed of at a suitable location. The amine absorbent is cooled to 30-40° C. and passed into the absorption chamber where the process starts over again. The temperature exchange of large amounts of absorbent requires a considerable amount of energy and reduces the electrical output from the plant by about 10%.

A general thermal power conversion process can be represented by the diagram in FIG. 2. Heat ($Q_H$) flows from a reservoir at a high temperature through a machine to a reservoir at a low temperature. Work W is performed along the way while heat $Q_L$ is added at the low temperature reservoir. The efficiency of the process is given by equation (1).

$$\eta = \frac{W}{Q_H} \quad (1)$$

The theoretical efficiency (Carnot efficiency) for a thermal power conversion process is generally given in equation (2) where $T_H$ and $T_L$ are high and low temperatures, respectively, in the power conversion process.

$$\eta = \frac{T_H - T_L}{T_H} \quad (2)$$

This represents a fundamental limit for the efficiency of thermal processes. In general, it is preferable to have as large temperature differences as possible in order to increase efficiency.

When recovering energy from the temperature exchange from 130° C. to 40° C. in an amine process, the theoretical output according to equation (2) is 66.9%. In practice, it is far lower, and energy from the recovery process is present as relative low quality heat energy which can primarily only be used for heating. A gas power plant with amine cleaning is presented in FIG. 3.

RU2229335 C1 relates to an absorption medium for $CO_2$ that is a mixture of calcium oxide and a eutectic mixture of alkali metal carbonates manufactured in the form of grains.

JP11028331 A discloses electrochemical separation of $CO_2$, where $CO_2$ is converted to $CO_3$ at the cathode by an electrochemical reaction.

JP 10085553 discloses separation of $CO_2$ by passing the exhaust gas through a membrane where the fibres consist of a composite oxide that creates $CO_2$ by a chemical reaction with $CO_2$ and an oxide.

US2005036932 discloses a method for absorbing and removing $CO_2$ from an exhaust gas. The exhaust gas is blown through an agglomerate of solid particles containing CaO and/or $Ca(OH)_2$ such that $CO_2$ in the exhaust gas is converted to $CaCO_3$.

Terasaka et al. (Chem. Eng. Technol. 2006, 29 No 9, pages 1118-1121) has disclosed a process where $CO_2$ is absorbed using solid particulate lithium silicate ($LiSiO_4$) in a slurry of molten salts as the working medium. $Li_2CO_3$ and $Li_2SiO_3$ are formed and are present as solid particles in the slurry.

Current technology discloses several different methods for the capture of $CO_2$. The disadvantages to these include primarily the size of the treatment plants and low energy efficiency in the power conversion process.

It is an object of the present invention to obtain a method for cleaning $CO_2$ from exhaust gases from combustion plants, where the method will provide improved efficiency and power quality for energy recovery from the cleaning process. In addition, it is desirable to improve the efficiency of $CO_2$ cleaning with using faster chemical reactions so that the physical size of the cleaning plant can be reduced.

The present invention provides a method for the removal of carbon dioxide from a gas stream, where the gas stream is brought in contact with an absorption medium in a first step, where the absorption medium includes a molten salt comprising at least one halide of an alkali or earth alkali metal and having a content of dissolved metal oxide MO that reacts with the carbon dioxide to form a soluble metal carbonate, and where the melting point for the absorption medium is within the range of 600 to 1400° C.

Further the invention relates to the use of molten salts comprising at least one halide of an alkali or earth alkali metal and having a content of dissolved metal oxide for the removal of carbon dioxide from a gas stream.

The invention also provides an absorption medium for the removal of carbon dioxide from a gas stream, where the absorption medium comprising molten salts containing at least one halide of an alkali or earth alkali metal having a content of dissolved metal oxide.

FIGURES

Figure 4:
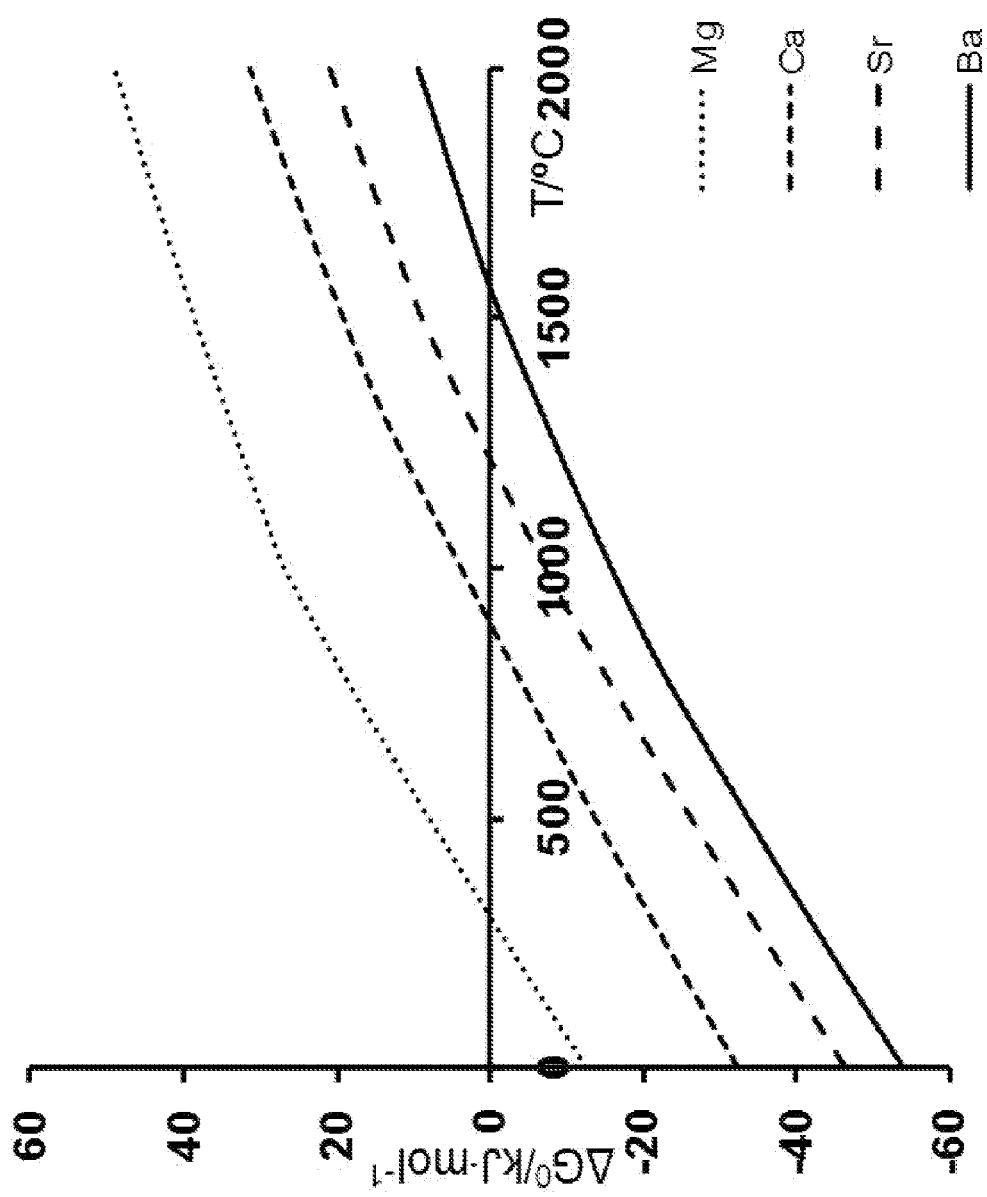

FIG. 4 is a graph illustrating the Gibbs free energy for reaction (5). Positive values indicate that the reaction progresses toward the left. Negative values indicate that the reaction progresses toward the right.

Figure 5:
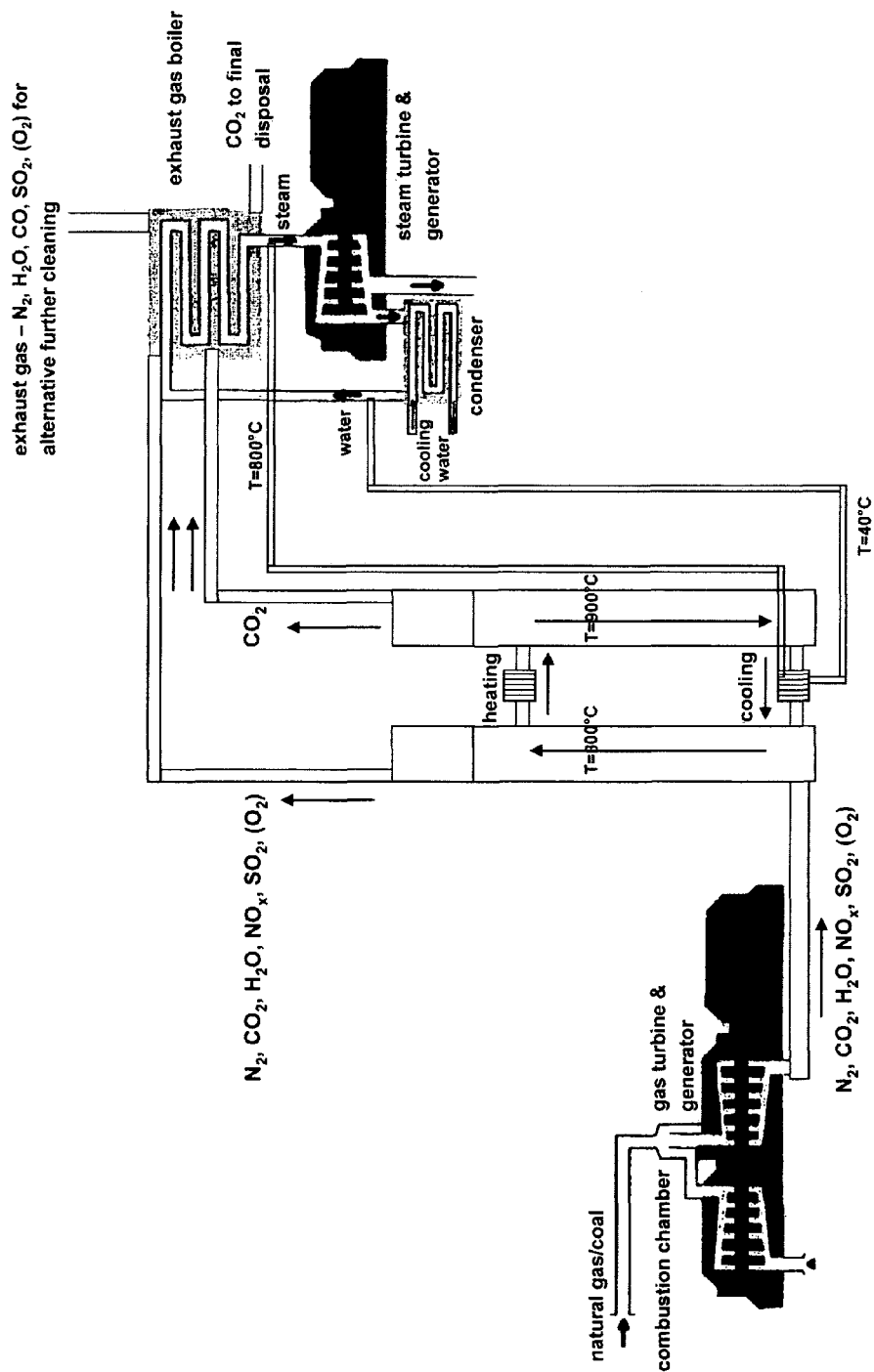

FIG. 5 is a schematic diagram of high temperature molten salt absorption of $CO_2$ from a gas power plant.

Molten salts are used in the chemical process industry in different applications. Worth mentioning are electrolytes in electrolytic processes, as catalytic media in pyrolytic processes and as electrolytes in batteries and photoelectrochemical solar panels. In general, molten salts consist of metal-anion compounds with varying compositions. These in themselves are thermodynamically very stabile, while also being efficient solvents for other compounds and elements. Some molten salts have a degree of solvency for carbon in the form of $CO_2$. This is particularly applicable for chlorides such as M—$Cl_x$, fluorides such as M-$F_x$ and nitrates such as M—$(NO_3)_y$, where M is a metal with a valency of x or y/2.

In general, oxides will be soluble in molten salts with opposite Lewis acid-base characteristics so that acidic melts dissolve basic oxides and vise versa. A good example of this is $CaCl_2$ which in itself has a weakly acidic character. This results in basic (CaO, MgO) and to a certain extent amphoteric oxides being easily dissolved, while acidic oxides ($SiO_2$, $TiO_2$) are only minimally dissolved. Basic oxides have an affinity for $CO_2$ during the formation of carbonates according to the equation (3)

$$CaO+CO_2 \rightleftharpoons CaCO_a \quad \Delta G°_{300K}=-30 \text{ kJ/mol} \qquad (3)$$

Similarly to calcium oxide, calcium carbonate has basic properties and will generally dissolve in acidic melts. This is, however, not universally valid since both CaO and $CaCO_3$ will also dissolve in fluorides such as $CaF_2$ which exhibit basic properties. Calcium carbonate is very stable at room temperature, but will decompose to CaO and $CO_2$ according to the equation (4) at temperatures above 850-900° C. Table 1 shows $\Delta G$ for reaction (3) as a function of temperature. This is the opposite reaction of (4) so that the same numbers apply for (4), but with opposite sign.

$$CaCO_z \rightleftharpoons CaO+CO_2 \qquad (4)$$

TABLE 1

Gibbs free energy for reaction (3) as a function of temperature.

| Temp (° C.) | $\Delta G$ (kJ/mol) |
|---|---|
| 500.000 | −56.640 |
| 600.000 | −41.695 |
| 700.000 | −26.945 |
| 800.000 | −12.385 |
| 900.000 | 1.986 |
| 1000.000 | 16.169 |
| 1100.000 | 30.164 |
| 1200.000 | 43.973 |
| 1300.000 | 57.595 |
| 1400.000 | 69.429 |
| 1500.000 | 80.317 |

By taking advantage of the affinity CaO has for $CO_2$, the reaction (3) and (4) can be used for capture of said gas from a diluted gas mixture, e.g. from a coal power plant, by passing the gas mixture through molten salts with dissolved CaO which then will draw carbon dioxide from the gas mixture and form $CaCO_3$. The temperature of molten salts is normally in the area of 600-1500° C. and the high temperature, combined with the catalytic properties of the molten salts, provides for very efficient capture.

The Gibbs free energy of reaction (3) and (4) for the other earth alkali metal oxides is calculated using HSC Thermodynamic Software Tool, Outotech 2008.

FIG. 4 shows that the free energy according to (4) for the different earth alkali metal oxides changes its sign at higher temperatures as we move further down the periodic system. This can be taken advantage of by using the heavier oxides for absorption in combustion processes where the exhaust gas temperature is high. It is advantageous to have a large driving force (large, negative $\Delta G$) to ensure a fast processes. Meanwhile, the speed of the processes normally increases with increasing temperature. This leads to opposite effects for the absorption of $CO_2$ in molten salts, so optimal working conditions must be found experimentally in each case. When oxide and corresponding carbonate are present and dissolved in the molten salts, they will constitute a different medium and environment than when they are present in free form in unit activity as predicted in (4), but qualitatively the behavior will be similar for the different cations. Similar calculations for the alkali metal oxides show that these are more stable so that the sign in reaction (4) will not change at the given operating temperature. This applies to the conditions that the calculations are performed at (STP, unit activity, solid phase) and is not necessarily representative when the reactants are dissolved in the molten salts. Under these conditions, the stability of the compounds will be lower so that alkali metal oxides/carbonates also function as active compounds in the invention.

The $CO_2$-solubility in the gaseous state in molten salts is a function of temperature in that the solubility decreases with increasing temperature T. This is disclosed to a certain extent in E. Saido, et al., J Chem Eng, Data, 25, (1), 1980, pages 45-47. The solubility of the gaseous $CO_2$ is in the area of 0.1-1% and can lead to a reduction in process efficiency during the formation and decomposition of $CaCO_3$.

Figure 1:
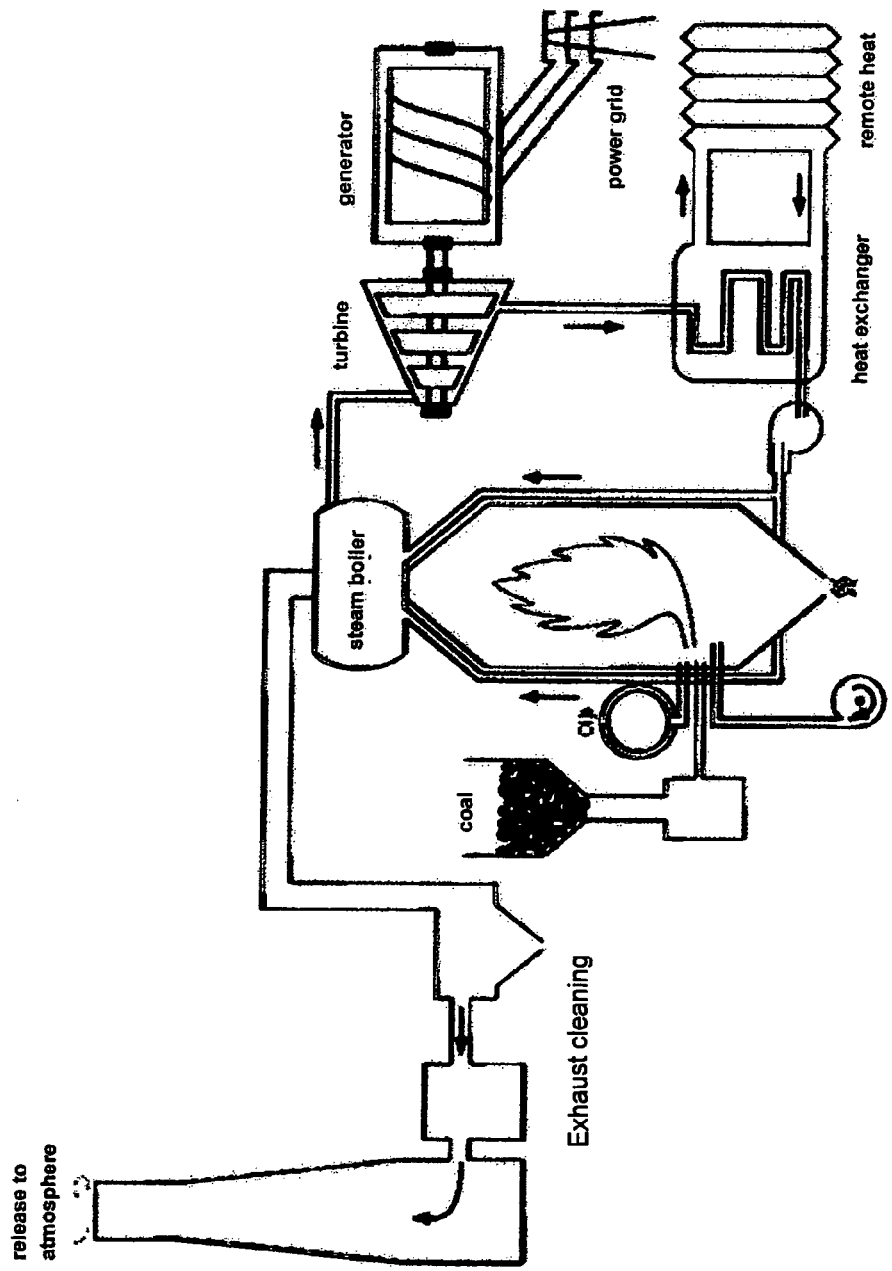
FIG. 1 is a schematic illustration of a conventional heating power plant (B. Sørensen).
Figure 2:
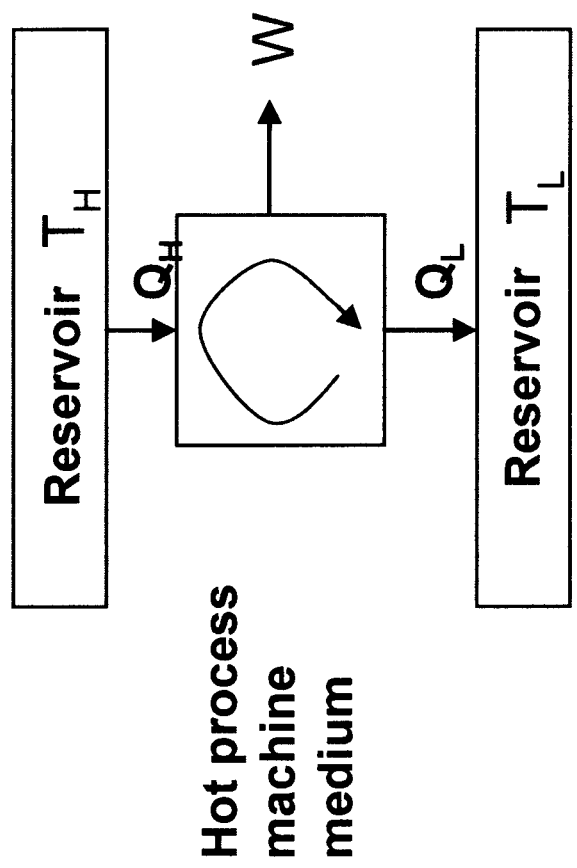
FIG. 2 is a schematic illustration of a general power conversion process.
Figure 3:
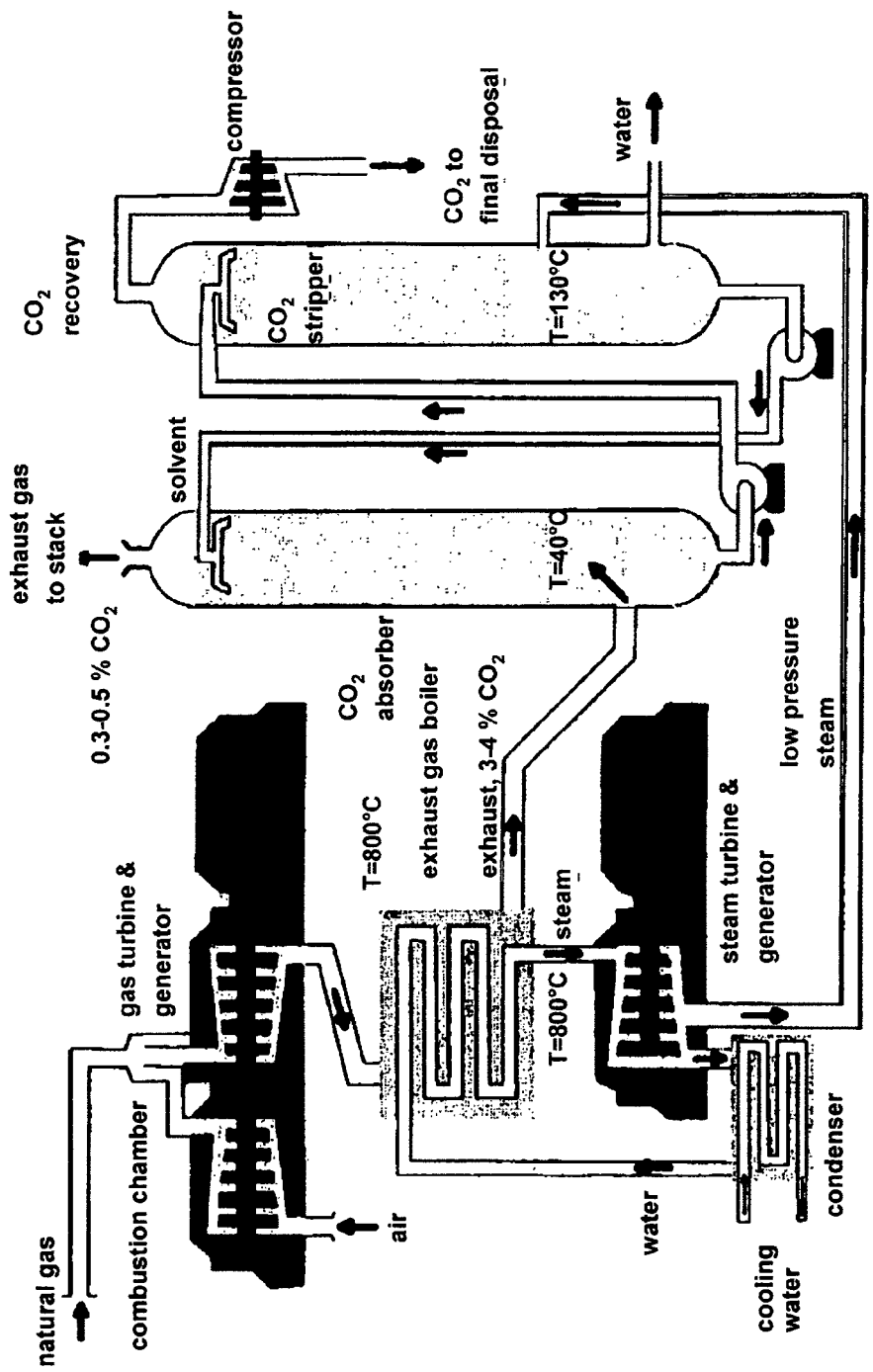
FIG. 3 is a schematic illustration of a gas power plant with an amine cleaning plant from SINTEF.

Solid phase reactions are not included in the present invention since the reactants are present as dissolved complex ions in the stated molten salts. This results in significantly faster kinetics than in the prior art and there is therefore no need for a slurry as the solution can be held in a liquid state. In stead of absorbing $CO_2$ from the combustion gases in the low temperature zone after heat exchange with steam, this can be conducted prior to cooling of the combustion gases. Immediately after combustion, the gases have a temperature in the area of 800-1400° C. In a coal power plant the gases are present at approximately atmospheric pressure and withdrawal of energy occurs in a conventional steam boiler where water is heated to approximately the same temperature as the exhaust gases for driving the steam turbine which in turn drives the electric generator (FIG. 1). There is no reason for $CO_2$ to not be absorbed from the exhaust gases in a hot and/or pressurized condition. Molten salts, such as those presented above, have a melting point generally in the area of 600-1412° C., which falls within the temperature range of the combustion process. Such an absorption process can in principle be carried out as an amine process, but at higher process temperatures. The absorption temperature will be in the range of 600-1600° C. It is assumed that the increased temperature will result in faster process kinetics so that a plant of this type can be made physically smaller than an amine absorption plant which is physically very large. A plant of this type is presented in FIG. 5. In a gas power plant, the combustion gases will be highly pressurized before the turbine, which provides an additional increase in the efficiency of this process if it is placed here, since the partial pressure of $CO_2$ in the gas mixture will be significantly higher than at atmospheric pressure (10-20 atm).

For example, hot exhaust gases are passed through molten salts consisting of $CaCl_2$ at approximately 700-800° C., where $CO_2$ is absorbed by the dissolved CaO in the molten salts in a chamber during the formation of $CaCO_3$. The melt, which has a high $CaCO_3$ content, is then passed to a desorption chamber and heated to approximately 950° C. in order to release the gas. This can be explained theoretically by equation (5) which moves toward the left at T>850° C. when $\Delta G$>0 (see Table 1).

$$CaO(\text{diss},CaCl_2)+CO_2(g) \rightleftharpoons CaCO_2(\text{diss},CaCl_2) \qquad (5)$$

The treated exhaust gases and $CO_2$ then undergo heat exchange with water in separate circuits in order to generate high temperature steam to drive a steam turbine which, in turn, drives an electric generator. The molten salts containing dissolved and regenerated CaO, are cooled to 800° C. prior to reintroduction to the absorption chamber. In this process the melt undergoes heat exchange with steam which again will drive a turbine for the generation of electric power—preferably the same that is powered by steam generated from the hot exhaust gases. The advantage of cleaning the gas while it is at a high temperature is that it will provide a higher electrical efficiency from the total power conversion process. The theoretical Carnot efficiency (see equation 2) in such a process for the recovery of process heat from the cooling of molten salts from 950° C. to 800° C. in the absorption plant, is 95%, if we assume that $T_L$ is about 40° C. after extraction of power from the cooling medium (and condensation in the case of steam) to electrical power, along with a $T_H$ of about 800° C. In addition, this will generate high quality electrical power in stead of low quality water borne heat.

Alternately, the change in pressure between the absorption and desorption chambers can, in principle, function in the same way as a change in temperature. In a gas power plant, a greater proportion of the power in the fuel is related to the hydrogen content of the gas and therefore a third method exists for the removal of $CO_2$ released to the atmosphere, that is electrochemically removal of the carbon from the dissolved carbonate in the molten salts in the desorption chamber. In this case, elementary carbon is generated which can be removed from the process path and be disposed of. This is an alternative to the precombustion reformation of natural gas to carbon (carbon black) and hydrogen prior to combustion of the hydrogen.

An immediate challenge with the concept presented above, is that any water that is present in the combustion gas to be cleaned, can lead to hydrolysis of some molten salts, primarily chlorides, to oxyhydrochlorides. This can be avoided by using melts that are not subject to this problem, preferably basic fluorides, or a continuous regeneration process can be run where some of the melt is continuously withdrawn for treatment.

All types of molten salts can, in principle, be used as solvents for oxides and carbonates such as CaO or $CaCO_3$. Applicable molten salts can be nitrates, chlorides and fluorides.

The present invention relates to molten salts where the metal oxide is dissolved in the melt. The molten salts include preferably halides, preferably chlorides and most preferably fluorides. The molten salts that are used in the present invention are mainly based on earth alkali and alkali metals, but other molten salts can be applicable.

The metal oxide that is dissolved in the molten salt and reacts with $CO_2$ is substantially based on earth alkali and alkali metals, but other metal oxides may also be applicable. Preferred metal oxides can be selected from the group consisting of $MgO$, $CaO$, $SrO$, $BaO$, $Li_2O$, $Na_2O$, $K_2O$, $Rb_2O$ and $Cs_2O$.

The invention claimed is:

1. A method for the removal of carbon dioxide from a gas stream, comprising:
    a first step of contacting the gas stream with an absorption medium, wherein the absorption medium comprises molten salts containing at least one halide of an alkali or alkali earth metal that have a content of dissolved metal oxide which react with the carbon dioxide and create a metal carbonate, and
    a second step of heating the molten salts containing metal carbonate and releasing metal oxide and carbon dioxide,
    wherein the method is carried out at a temperature of 600 to 1600° C.

2. The method according to claim 1, wherein the molten salts comprise chlorides.

3. The method according to claim 1, wherein the molten salts comprise fluorides.

4. The method according to claim 1, wherein the metal oxide is selected from the group consisting of $MgO$, $CaO$, $SrO$, $BaO$, $Li_2O$, $Na_2O$, $K_2O$, $Rb_2O$ and $Cs_2O$.

5. The method according to claim 1, further comprising, in the first step, controlling the temperature of the molten salts so that the carbon dioxide is substantially converted to carbonate, and, in the second step, raising the temperature so that metal oxide and carbon dioxide are released.

6. The method according to claim 2, further comprising, in the first step, controlling the temperature of the molten salts so that the carbon dioxide is substantially converted to carbonate, and, in the second step, raising the temperature so that metal oxide and carbon dioxide are released.

7. The method according to claim 3, further comprising, in the first step, controlling the temperature of the molten salts so that the carbon dioxide is substantially converted to carbonate, and, in the second step, raising the temperature so that metal oxide and carbon dioxide are released.

8. The method according to claim 4, further comprising, in the first step, controlling the temperature of the molten salts so that the carbon dioxide is substantially converted to carbonate, and, in the second step, raising the temperature so that metal oxide and carbon dioxide are released.

* * * * *